(12) United States Patent
Puente et al.

(10) Patent No.: US 6,820,132 B1
(45) Date of Patent: Nov. 16, 2004

(54) INTERNET COMMUNICATION SYSTEM AND METHOD WITH ASYMMETRIC TERRESTRIAL AND SATELLITE LINKS

(75) Inventors: David S. Puente, Olney, MD (US); Burt H. Liebowitz, North Bethesda, MD (US); Thomas Jacobson, Gordon, WI (US)

(73) Assignee: Loral CyberStar, Inc., Rockville, MD (US)

( * ) Notice: Subject to any disclaimer, the term of this patent is extended or adjusted under 35 U.S.C. 154(b) by 0 days.

(21) Appl. No.: 09/523,772

(22) Filed: Mar. 11, 2000

Related U.S. Application Data

(63) Continuation-in-part of application No. 09/017,142, filed on Feb. 2, 1998, now Pat. No. 6,038,594.

(51) Int. Cl.[7] .............................................. G06F 13/00
(52) U.S. Cl. ........................ 709/238; 709/203; 709/217
(58) Field of Search ............................... 709/200, 201, 709/203, 217, 218, 219, 225, 226, 227, 238

(56) References Cited

U.S. PATENT DOCUMENTS

| | | | | |
|---|---|---|---|---|
| 5,940,739 A | * | 8/1999 | Conrad et al. ............. | 455/13.1 |
| 5,991,596 A | * | 11/1999 | Cunningham et al. ..... | 455/12.1 |
| 6,105,060 A | * | 8/2000 | Rothblatt .................... | 709/219 |
| 6,141,333 A | * | 10/2000 | Chavez, Jr. ................. | 370/338 |
| 6,172,972 B1 | * | 1/2001 | Birdwell et al. ............ | 370/349 |
| 6,205,485 B1 | * | 3/2001 | Kikinis ....................... | 709/231 |
| 6,243,760 B1 | * | 6/2001 | Armbruster et al. ........ | 709/243 |
| 6,324,182 B1 | * | 11/2001 | Burns et al. ................ | 709/243 |
| 6,338,131 B1 | * | 1/2002 | Dilon .......................... | 712/201 |
| 6,377,981 B1 | * | 4/2002 | Ollikainen et al. ......... | 709/217 |
| 6,385,647 B1 | * | 5/2002 | Willis et al. ................ | 709/217 |
| 6,519,651 B1 | * | 2/2003 | Dillon ......................... | 709/250 |
| 6,598,048 B2 | * | 7/2003 | Carneal et al. ............. | 707/10 |

* cited by examiner

*Primary Examiner*—Moustafa M. Meky
(74) *Attorney, Agent, or Firm*—Karambelas & Associates

(57) ABSTRACT

Low-cost, high performance access is provided to an Internet service provider (ISP) not convenient to a high volume Internet exchange point using a flexible hybrid terrestrial-satellite Internet communications system and method. The system and method provide high volume connectivity between an Internet service provider (ISP) and a remote customer site that generates a request for content to be supplied by the ISP. In an exemplary system, a first gateway processes a request for content generated at the remote customer site and routes the request. A second gateway processes the request routed by the first gateway to route the request to the content provider. One or more satellites are used to transmit requested content supplied by the ISP to the remote customer site. An exemplary method comprises the steps of generating a request for content at the remote customer site, processing the request for content to route it to the content provider, and transmitting requested content supplied by the ISP to the remote customer site by way of one or more satellites. The request for content may be routed by way of a terrestrial communications link, such the Internet, or may be routed to the ISP by way of the one or more satellites. The transmitted content may be received directly at the remote customer site, or routed to the remote customer site by way of a gateway or other point of presence (pop) site.

25 Claims, 8 Drawing Sheets

INTERNET COMMUNICATION SYSTEM AND METHOD WITH ASYMMETRIC TERRESTRIAL AND SATELLITE LINKS

CROSS REFERENCE TO RELATED APPLICATIONS

This application is a continuation-in-part application of U.S. patent application Ser. No. 09/017,142, filed Feb. 2, 1998, now U.S. Pat. No. 6,038,594, issued Mar. 14, 2000.

BACKGROUND OF THE INVENTION

1. Field of the Invention

The present invention relates to Internet communications systems, and more particularly to an asymmetrical hybrid satellite-terrestrial communications network for such systems.

2. Background and Prior Art

Abbreviations used below

ATM—asynchronous transfer mode
BGP—border gateway protocol
CIR—committed information rate
DLCI—data link connection identifier
EIR—excess information rate
EISP—Europe-based Internet service provider
ERTR—Europe-based Internet service provider US gateway router
FRS—frame relay switch
IP—Internet protocol
IPX—a Novell network protocol
ISP—Internet service provider
LM—link management
NAP—network access point
POP—point of presence
PVC—permanent virtual circuit
REP—reply packet
REQ—request packet
SCPC—single channel per carrier
URTR—router of US Internet service provider cooperating with Europe-based Internet service provider router
USISP—US Internet service provider
VSAT—very small aperture terminal The Internet is a collection of independent computer networks, which communicate with each other using standard communication protocols. By using such standard protocols, any user on any network can access any server on any other network on the Internet, subject to security considerations.

Entry into the Internet is furnished by Internet Service Providers (ISPs). ISPs operate networks that connect with each other at network access points (NAPs).

A typical network includes communication links and routing devices known as routers. A router includes tables which correlate addresses with destination information. Routing protocols are used to keep the information in the routing tables up to date to ensure that the information tables contain accurate information. Information is transmitted between NAPs in the form of individual data packets. Each packet contains an embedded source and destination address to which the packet is routed across the networks.

A typical Internet transaction involves a small amount of data in the form of a request from a user or client, and a much larger amount of data in the form of a response from the server of the content provider containing the requested information. The traffic imbalance represents a substantial waste of bandwidth in an asymmetric terrestrial link.

Many Internet users are limited to voice grade terrestrial communication lines with dial-up access, in which bandwidth is limited to 28 Kbps and 56 Kbps. Where faster data rates are available, they are very expensive. ISPs have been known to undersize their banks of telephone modems to reduce costs, and oversubscribe their service to increase revenues. This results in the inability of users to connect to the ISP during peak hours of usage and the tendency of users to stay connected longer once access is gained, for fear of not being able to get back on line, resulting in more Internet congestion.

One situation in which unequal data streams flow between requesters and Internet servers is that of Internet usage, called Web traffic, by users in Europe. Today in a nominal European country, 25% of requests on the Web are for content from within the country, 25% are for content that resides in the rest of Europe, and the remaining 50% is for content from the rest of the world, predominantly the United States. Most of this international traffic is routed via a Internet exchange point such as MAE-East, physically located near Washington D.C. When a user in Europe requests a Web page or file located in the United States, a small amount of data flows to the United States in the form of the request, and a relatively large data stream constituting the responses to request flows from the United States to Europe. Currently, the amount of data transmitted to Europe is three to five times that transmitted from Europe to the United States.

For purposes of the present description, remote ISPs are described as not being conveniently connected to the Internet. This refers to the condition of there being some inherent problem with terrestrial backbone infrastructure to meet the explosive growth of Internet traffic. United States ISPs in the present example are referred to as high volume ISPs in that their terrestrial backbone infrastructure provides capacity, connectivity and peering for Internet traffic.

The present system may in fact end up being used between infrastructures that are each rather well developed. This terminology is used simply as a context through which the present invention is described.

It is desirable to provide a system which maximizes use of available bandwidth, provides for asymmetrical use of satellite and terrestrial links and efficiently handle packets of data. The concept of asymmetrical bandwidth in a hybrid communications network using satellite and terrestrial links is known. In a known prior art system, a desktop client launches an Internet application on an IPX network. The client connects to an Internet gateway to a server using technology providing traffic management and asymmetric routing. The user sends a request to a control center over a telephone connection with the return IP address of the customer's satellite dish. The response to the customers request is beamed to one of the satellites which beams the response back to the customer dish. The dish forwards a response to a server to an IP gateway which sends the response back to the desktop via IPX. This system meets its intended objectives. However, the present invention is intended to meet different and further objectives.

SUMMARY OF THE INVENTION

It is therefore a general objective of the present invention to provide an asymmetric, hybrid terrestrial-satellite Internet communications network and method in which use of available bandwidth is maximized and dynamically configured across points along the Internet backbone.

It is also an objective of the present invention to provide a system and method of the type described in which additional bandwidth may be provided temporarily at a selected point or points in the network either by a preselected pattern or in a condition-responsive manner.

It is a more specific objective of the present invention to provide a system and method of the type described in which additional bandwidth may be provided temporarily at a selected point or points in the network in response to demand.

It is also an objective of the present invention to provide a system and method of the type described in which permanent virtual circuits are created for guaranteeing bandwidth to a user.

It is also an additional objective of the present invention to provide a system and method of the type described in which permanent virtual circuits are created to allow provision of additional bandwidth to a user when excess system capacity exists.

It is also a further objective of the present invention to provide a system and method of the type described in which permanent virtual circuits are created for the purpose of broadcast or multicast.

It is also an objective of the present invention to provide a system and method of the type described in which scalability is provided by assigning more permanent virtual circuits to a network or by assigning more bandwidth to a specific permanent virtual circuit, whereby a user network may be readily upgraded.

It is an additional objective of the present invention to provide a system and method of the described in which a border gateway protocol is used to exchange data to and from the Internet.

It is another objective of the present invention to provide a system and method of the type described in which redundant or alternative paths are provided should a link become disabled.

It is also another objective of the present invention to provide a system and method of the described in which a border gateway protocol (BGP) is used to control routing of data in the hybrid environment to aid in providing redundancy as well as normal routing in the hybrid environment.

It is still another objective of the present invention to provide a system and method of the type described in which terrestrial routing between a satellite earth station antenna and an ISP is optimized.

It is another objective of the present invention to provide a system and method of the type described in which terrestrial satellite links a connected to a closest point of request on the requesting backbone.

It is a general object of the invention to provide a system and method of the type described which connects to the backbone structure of the Internet, and which an ISP may view as an overlay on his system without need for the ISP to purchase additional capital equipment.

It is a general objective of the invention to provide a system and method of the type described which connects to a backbone of the Internet, and which an ISP may view as a complimentary enhancement of the ISP's backbone.

Briefly stated, in accordance with the present invention, low-cost, high performance access is provided to an Internet service provider (ISP) on a group of Internet service providers (ISPs) not convenient to a high volume Internet exchange point through a flexible hybrid terrestrial-satellite Internet communications system and method. The innovative hybrid system of the present invention employs at least one satellite and preferably a multiplicity of satellites, for example a constellation of satellites.

Exemplary embodiments of the present invention comprises a hybrid satellite-terrestrial Internet communications system and method that provide high volume connectivity between an Internet service provider (ISP) and a remote customer site that generates a request for content to be supplied by the ISP. In an exemplary system, a first gateway processes a request for content generated at the remote customer site and routes the request. A second gateway processes the request for content routed by the first gateway to route the request to the content provider. One or more satellites are used to transmit requested content supplied by the ISP to the remote customer site. An exemplary method comprises the steps of generating a request for content at the remote customer site, processing the request for content to route it to the content provider, and transmitting requested content supplied by the ISP to the remote customer site by way of one or more satellites.

An illustrative embodiment of the present invention includes the request for content routed by way of a terrestrial communications link, which comprises the Internet. The request for content is routed to the ISP by way of the one or more satellites. The transmitted content is received directly at the remote customer site. The requested content may also contain statistically multiplexing information packets comprising the requested content into permanent virtual circuits (PVCs) that maximize bandwidth usage. The requested content is routed to the remote customer site by way of a gateway or other point of presence (POP) site.

Asymmetric hybrid circuits are advantageously used to most efficiently handle the resulting asymmetry from low volume requests and high volume responses. By way of example, a request from a user is coupled via routers and servers to a point of presence (POP) of an ISP in a group. The group ISP POP also includes a gateway coupling the group ISP to a terrestrial link which has an opposite end for coupling to a high volume ISP. Requests are directed to the high volume ISP through a POP on the backbone of the high volume ISP, and responses are provided. Response information packets are highly statistically multiplexed by one or more routers into permanent virtual circuits (PVCs). In a hybrid network provider POP, switch means impose committed information rates on each PVC, the committed information rate comprising a guaranteed minimum bandwidth for its associated PVC. Known protocols are used in an unexpected manner to manage the switch means. Additional bandwidth may be assigned temporarily to a PVC. PVC burst capability is also provided. The hybrid network provider POP delivers signals to a satellite uplink. The satellite delivers signals incorporating all transmitted data to each POP in the group of ISPs. Routers coupled to each group ISP POP filter the downloaded satellite signals to direct responses to corresponding requests. Multicast or broadcast from the hybrid network provider POP may be provided. If either the satellite link or the terrestrial link is disabled, communication may be diverted to the other link. Management of transmitted bandwidth may be performed in a two-way terrestrial or two-way satellite network configuration. Redundancy is thus provided.

BRIEF DESCRIPTION OF THE DRAWINGS

The present invention will become more clearly understood from the following detailed description in connection with the accompanying drawings, in which.

DETAILED DESCRIPTION OF THE PREFERRED EMBODIMENTS

While the invention is applicable to any Internet communications network, the preferred embodiment will be described within the context of the system referred to above in which EISPs and USISPs interact. In this exemplification, a small amount of data in the form of protocol requests and control messages flow from Europe to the US, while a relatively large amount of data flows from the US to Europe. Current average data flow is 3 to 5 times larger in the US to Europe direction than in the opposite direction. FIGS. 1–5 are block diagrammatic representations of systems constructed in accordance with the present invention illustrating data flows. FIG. 6 is a block diagrammatic representation showing the invention in greater detail and including components of each of the present arrangements illustrated in FIGS. 1–5.

Figure 1:
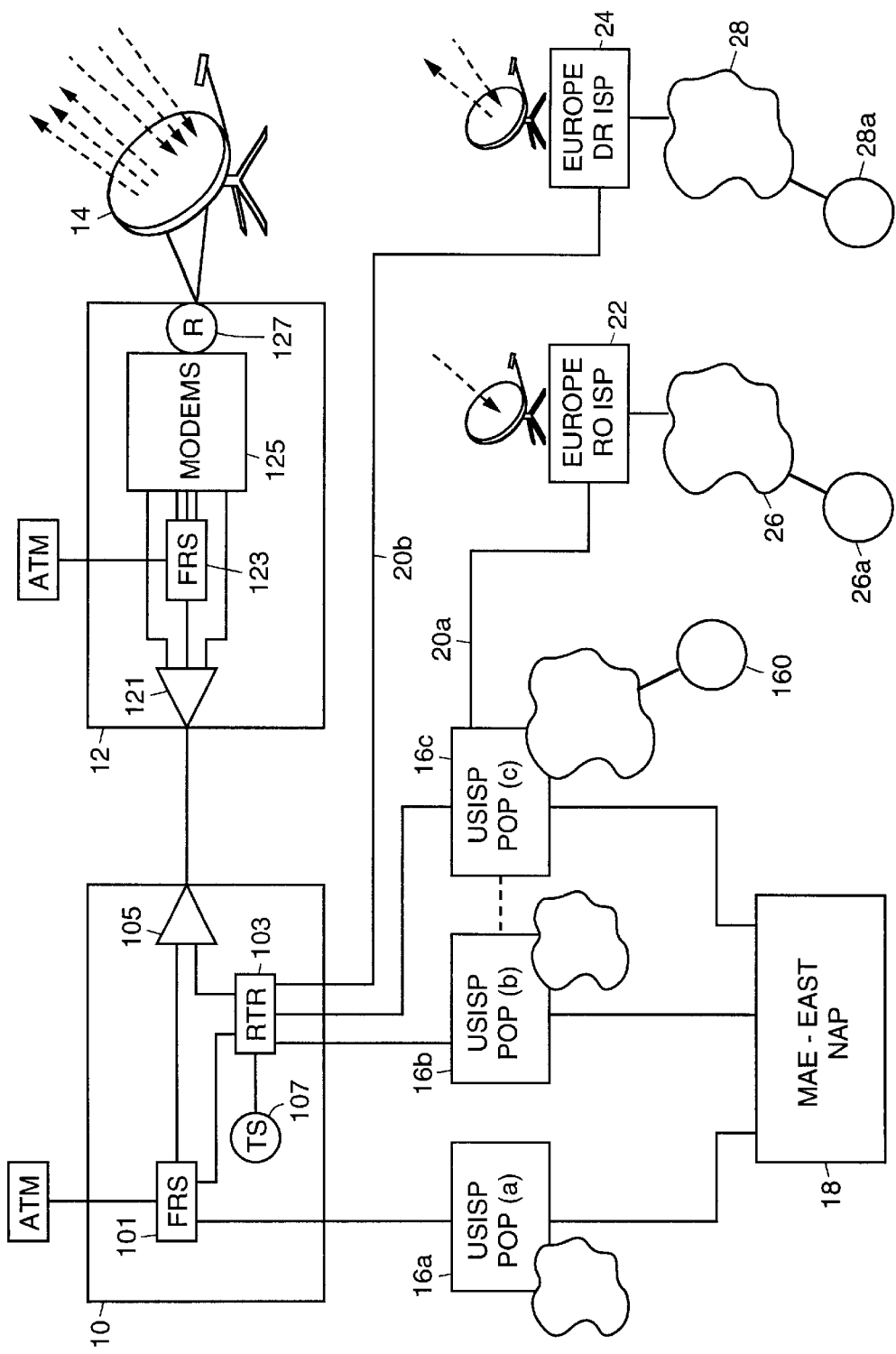
FIG. 1 is a block diagram of a satellite Internet communication system embodying a preferred embodiment of the present invention.

As shown in FIG. 1, a system according to one embodiment The invention includes a routing Point of Presence (POP) 10 and a satellite uplink/downlink POP 12 connected to a satellite antenna 14. The POP 10 interfaces with multiple USISPs 16a–16c, each of which has its own network (Networks (a)–(c)). USISPs 16a–16c are interconnected with each other through NAP 18. For purposes of the present description, a corporate intranet is an ISP. It's functions, while not identical to public, commercial ISPs, are susceptible of enhancement in the same manner through use of the present invention. Many corporate systems include their own satellite antenna dishes. For example, in one embodiment, the present invention can be used to deliver PVCs to the corporate antenna dish to provide a "rooftop to rooftop" system.

The POP 10 includes a frame relay switch 101, an array of routers 103, a multiplexer 105, and a test server 107. The test server 107 monitors the timely arrival of data packets at the correct destination. As shown, some USISPs may connect directly to the router array 103, while other USISPs link into the POP 10 through frame relay switch 101. High speed terrestrial connections to the Internet are provided by USISPs. Some routers in array 103 are dedicated to particular EISPs, while other routers are shared by EISPs. Management of the routers may be carried out by the EISP, cooperating USISPs, or by the satellite access service provider.

The frame relay switch also passes data from EISPs to USISPs arriving on an SCPC (Single Channel Per Carrier) channel or international terrestrial leased lines terminating at POP 10. Facility 12 includes a frame relay switch 123, a bank of satellite modems 125, and a transmitter 127 coupled to satellite antenna 14. The frame relay switch 123 comprises virtual circuit means 125. The virtual circuit means 125 may alternatively comprise an asynchronous transfer mode (ATM) switch. Facility 12 uplinks the satellite broadcast channels and also receives SCPC channels from EISP locations. POP 10 and satellite uplink facility 12 are connected through a high speed terrestrial link.

EISP POPs 22 and 24 are illustrative The type of POPs contemplated under the present invention. In particular, POP 22 is a receive-only station for data streams broadcast by the satellite, while POP 24 is shown as a transmit-receive station which is capable of uplinking data to the satellite as well as receiving data. POP 22 is part of a network 26 and POP 24 is part of a network 28. Transatlantic terrestrial links 20a and 20b are provided between the EISPs and either USISPs (for those EISPs that have existing relationships with USISPs) or to the satellite access provider POP (for those EISPs who wish to use the POP 10 as their connection to the US Internet). These links are used to connect EISPs who receive hybrid satellite/terrestrial service.

Using BGP, the cooperating USISP will announce to all ISPs on the Internet that any return packets destined for the EISP should be directed to the satellite uplink for transmission to the EISP. Internet core routers use this information to route data packets to the EISP through the optimal path. Intra-Europe routing is carried out through local terrestrial connections, while US to Europe routing according to the invention is carried out through the satellite link. If a link fails, its BGP announcement redirects data packets away from the satellite link to a preprogrammed alternate path if one exists.

Data transmission is carried out in the form of frame relay at the data link level. Separate PVCs are multiplexed and managed by the FRS. The PVCs are treated as separate physical circuits by the routers at each end, except that data arrives on virtual or sub-interfaces. Bandwidth guarantees are enforced at the FRS.

The frame relay PVCs are used as simplex (one-way) paths with routers configured for no Link Management (LM). Each PVC to an EISP is guaranteed a minimum bandwidth or Committed Information Rate (CIR) on the satellite channel. Each PVC is capable of providing additional burst bandwidth if such bandwidth is available on the carrier.

The two major service categories for the satellite Internet access system are hybrid service and two-way satellite service. Hybrid service consists of a high-speed satellite channel carrying data from a server (typically in the US) to a requester (typically in Europe), and terrestrial circuits for the requester-to-server (Europe-to-US) portion The link. In this way, costs are significantly reduced by eliminating the excess bandwidth otherwise present in a high-speed duplex link. Traffic with latency or privacy requirements can be routed to using either satellite or terrestrial circuits.

Two-way satellite service is available for those EISPs that do not use transatlantic terrestrial circuits. In such EISP networks, one or more sites are chosen as an uplink to support Web requests, protocol acknowledgments, and reverse content flow. Each POP can have its own uplink, or alternatively uplink POPs can be connected by local communication links to receive-only POPs.

As shown in FIG. 1, in hybrid configurations, the customer (EISP) chooses where to terminate the terrestrial link. Termination can be either at a router located at the satellite carrier POP 10 (link 20b), or at a router located at a USISP POP (link 20a). Termination of terrestrial link at the POP 10 by the satellite carrier allows the EISP customer to direct routing of different types traffic to reduce cost. For example, certain types of US-to-Europe traffic such as WWW and FTP can be sent by lower cost satellite channels, while other types of traffic such as Telnet and DNS can be sent through terrestrial channels.

Figure 2:
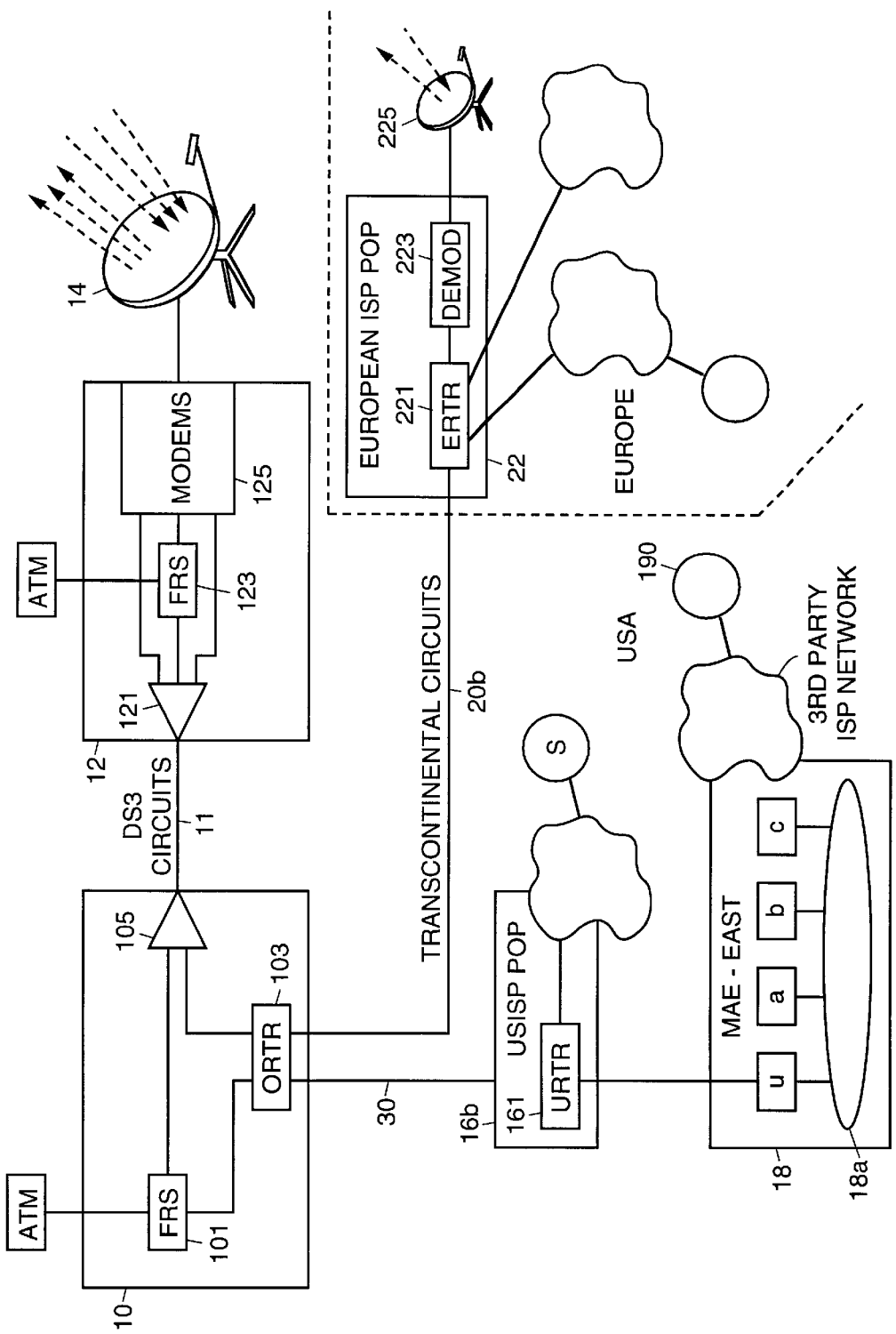
FIG. 2 is a block diagram illustrating the flow of data in a hybrid satellite/terrestrial configuration embodying the invention where an ISP is connected directly to the satellite service provider.

Examples of data flows for various system configurations will be now described with reference to FIGS. 2–4. FIG. 2 shows an example of a configuration in which a EISP 22 is directly connected to the satellite provider POP 10 through a transoceanic terrestrial full duplex circuit 20b, and a simplex satellite PVC for data transmissions from US Internet servers to Europe clients. All requests from Europe are routed to the US on the terrestrial circuit, while the larger responses are sent on the higher capacity satellite circuit. Data return on the terrestrial circuit is possible in the event of a satellite circuit failure, after a BGP timeout.

Data flow commences with a request packet (REQ) generated at client C on the EISP's network. The REQ contains the IP source address the client and the IP destination addresses The server (S) 190 stores the desired information. In this example, the server 190 is on a third party ISP network, that is different from the USISP providing US Internet access to the EISP.

The REQ is transmitted through the EISP's network to the EISP's US gateway router 221 (ERTR). Router 221 maintains BGP sessions with Internet backbone connections and router 103 The satellite provider. ERTR 221 makes routing decisions based on network number look-up tables and distance information received from BGP routers. ERTR also announces to the BGP routers network numbers that are part The EISP. Based on the destination address provided in the REQ, the ERTR 221 routes the REQ onto a transoceanic link 20b, where it is received by satellite provider POP 10. The router 103 routes the REQ via a frame relay PVC on a DS-3 link 30 to the router (URTR) 161 The cooperating USISP. URTR 161 routes the REQ to the destination server, based on the destination address. The REQ is sent to the cooperating USISP's router u at NAP 18, and then to the router c of the third party USISP through the NAP backbone 18a. Using BGP, the routers u and c exchange reachability and distance information. The REQ is then routed through the third party USISP's network until it reaches the router connected to the server 190. The REQ is then sent by that router to the server. The server processes the REQ and generates a reply packet (REP). The REP contains the source IP address the server, and the destination IP address. The requesting client connected to the EISP. The REP is sent through the third party's network and cross to the cooperating USISP at the closest NAP where the USISP's network is connected and "peered." In this regard, it is possible that the REP would enter the USISP's network through a different NAP than NAP 18 (such as MAE-West, Ameritech, Sprint, etc.) or through a direct private peering connection. The cooperating USISP's network carries the REP to URTR 161 at the USISP's POP 16b. URTR 161 then routes the REP to ORTR 103, the satellite service provider, where it is formatted into a standard frame relay packet and transmitted to FRS 101 on an appropriate Data Link Connection Identifier (DLCI) as a PVC. Individual PVCs are identified by their DLCI. The ERTR 221 announces the EISP's network to the ORTR 103 (and the cooperating USISP) by maintaining a BGP session with the ORTR through the terrestrial circuit link. In such sessions, BGP packets flow from the ERTR 221 to the ORTR and USISP through the terrestrial link. The BGP at the EISP is configured to neighbor with the ORTR satellite interface. If the satellite channel fails, the BGP session will timeout after a predetermined interval (about 3 minutes). Once the route changes propagate (in 1 to 10 minutes), all US-to-Europe REPs will flow through the terrestrial line. Since there is no return path through the satellite channel, routing table updates from the ORTR 103 to the ERTR 221 are blocked with a filter.

FRS 101 guarantees service quality by ensuring that no packet will be discarded as long as the customer transmission rate does not exceed the CIR. If the rate exceeds the CIR, the FRS 101 will make a best effort attempt to deliver all packets as long as the additional traffic rate does not exceed the Excess Information Rate (EIR) negotiated by the customer EISP. If the traffic rate exceeds the CIR plus EIR, the excess packets will be discarded.

The FRS 101 queues the REP for transmission on the high speed terrestrial link 11 between POP 10 and uplink facility 12. The REP is demultiplexed at facility 12 and sent to FRS 123. The REP frame is then queued on the appropriate frame relay satellite uplink based on its DLCI for transmission. Each ERTR at EISP POPs detects the entire frame relay satellite broadcast; however, its frame relay link controller receives and passes only packets addressed to DLCIs defined on that particular ERTR. The ERTR deencapsulates the REP and if the destination IP address matches an address of a client network connected to the POP in which the ERTR resides, the ERTR will forward the REP to the client. If there is no match, the ERTR will discard the packet.

Figure 3:
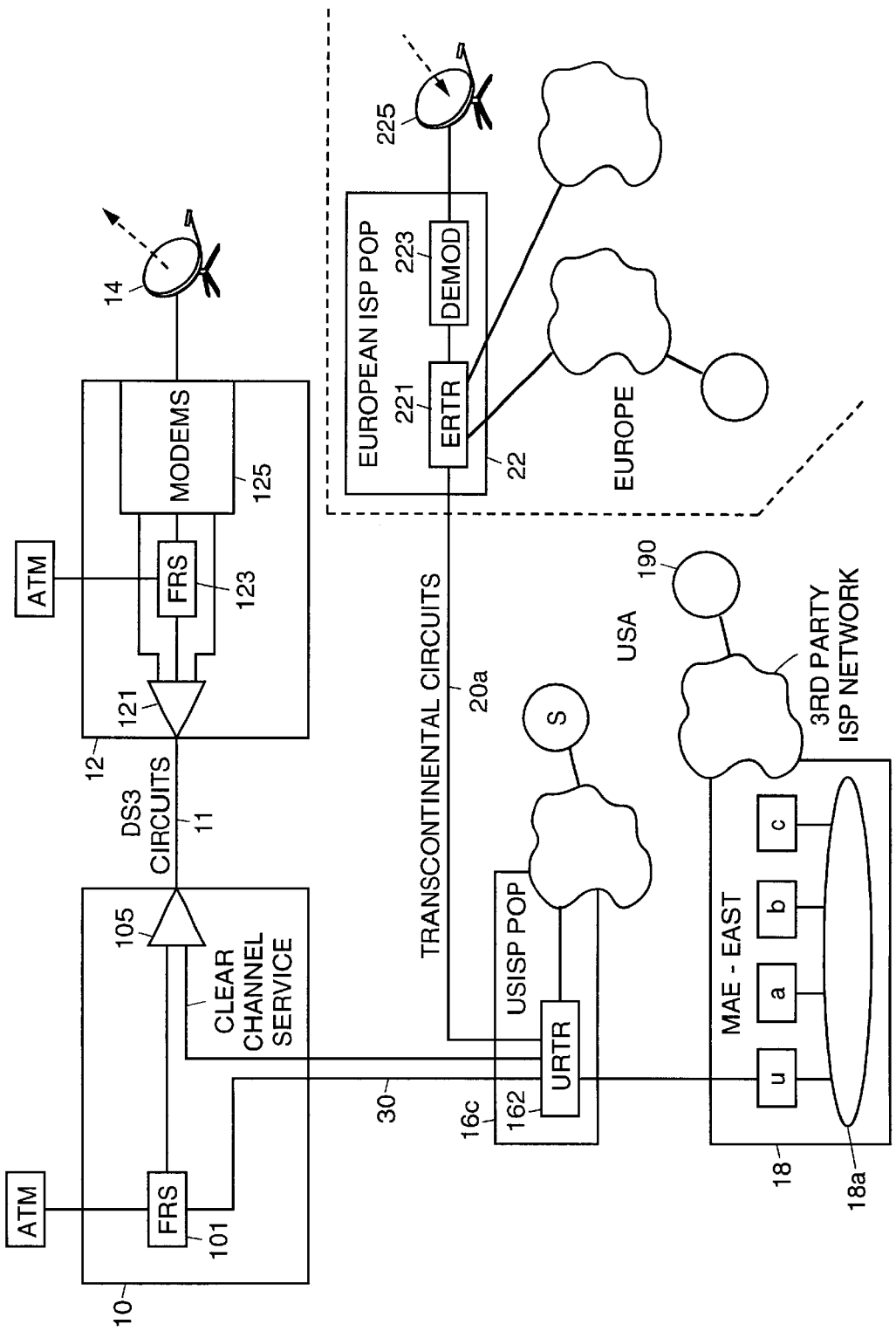
FIG. 3 is a block diagram illustrating the flow of data in a hybrid satellite/terrestrial configuration embodying the invention where an ISP has Internet connectivity through a backbone ISP or through a terrestrial link to a second ISP.

FIG. 3 shows a configuration in which the EISP obtains primary US Internet connectivity through an international leased terrestrial link 20a directly to a USISP unrelated to the satellite service provider. In this case all REQs are sent to the router (URTR) 162 of the USISP 16c, while REPs return to the client on the higher capacity satellite channel. POP 16c and POP 10 by connected by a PVC and transmitted via a private terrestrial local loop and port on the FRS 101 or over high speed international line connections established by the USISP. Also, the USISP is responsible for configuring and maintaining BGP peering.

Figure 4:
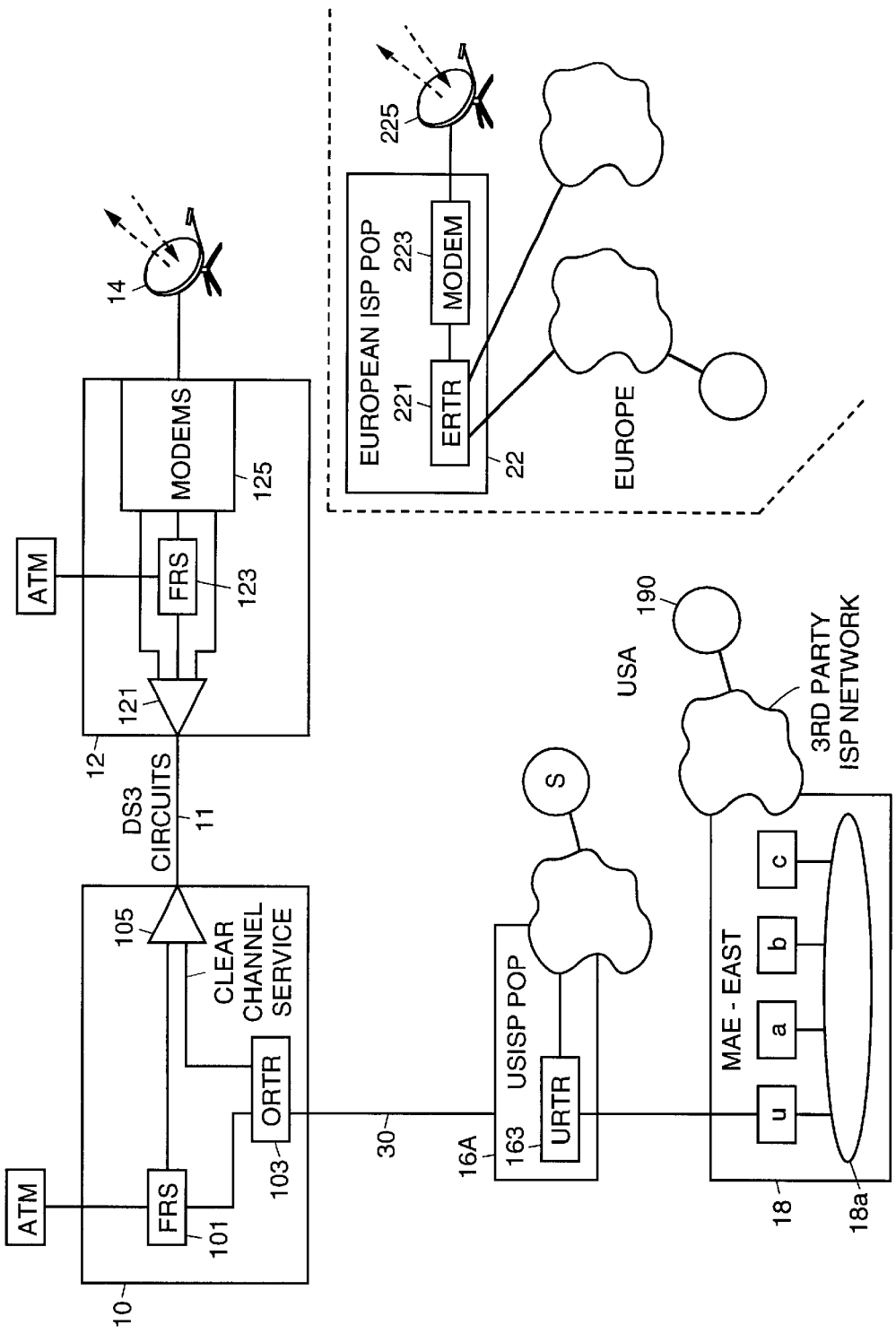
FIG. 4 is a block diagram illustrating the flow of data in a hybrid satellite/terrestrial configuration embodying the invention where an ISP uses a two-way satellite link to obtain connectivity to the Internet.

FIG. 4 illustrates a two-way satellite configuration. In this configuration, the EISP 22 obtains its primary US Internet connectivity through a two-way satellite circuit. Other forms of connectivity to the US may be available from a European connectivity provider, but the EISP will normally use such connection for European Internet traffic. Data flow in this configuration is also similar to the hybrid connection explained with reference to FIG. 2. In the configuration of FIG. 4, the REQ is sent from the client C through the EISP's network to the ERTR 221 at the EISP POP 22. ERTR 221 is configured to maintain a BGP session with ORTR 103 at satellite provider POP 10, and receives full Internet routing table information from each Internet connection maintained. Based on the IP destination address, ERTR 221 routes the REQ onto the satellite modem 226 located at POP 22. The satellite link from Europe to the US is on a dedicated SCPC channel. The CIR is typically set to the same speed as the modem data rate. The REQ traverses the satellite link and arrives at a dedicated modem in modem bank 125 and separate dedicated port on FRS 123 at facility 12. The separate frame relay PVC is transmitted over high speed terrestrial link 11 to the ORTR 103 at POP 10. ORTR 103 then sends the REQ on a terrestrial link 30 to the URTR 163 at the USISP 16a.

Figure 5:
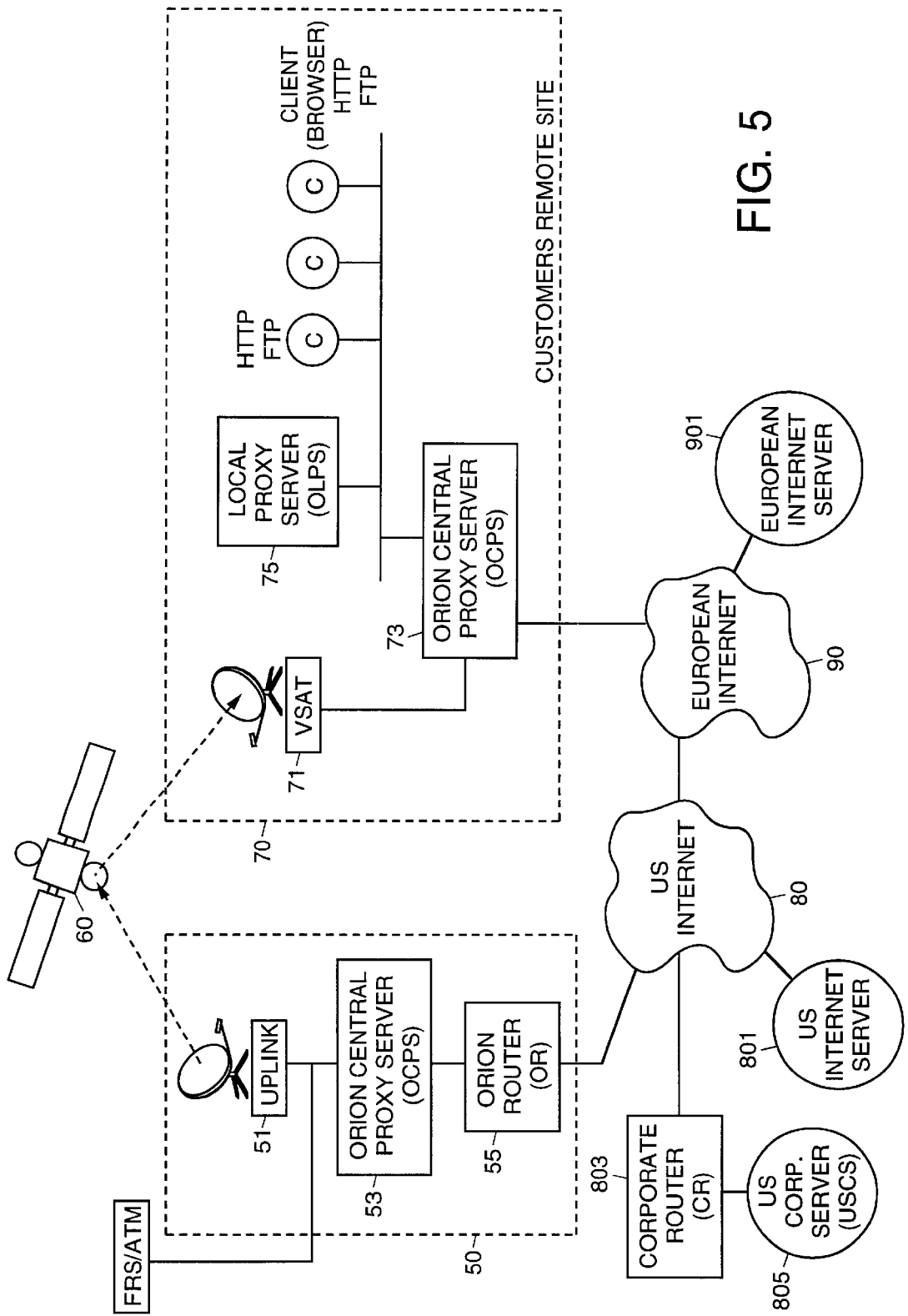
FIG. 5 is a block diagram illustrating an embodiment of the invention providing "rooftop to rooftop" or "satellite to rooftop" Internet/intranet connectivity service for customers such as multinational corporations.
Figure 6:
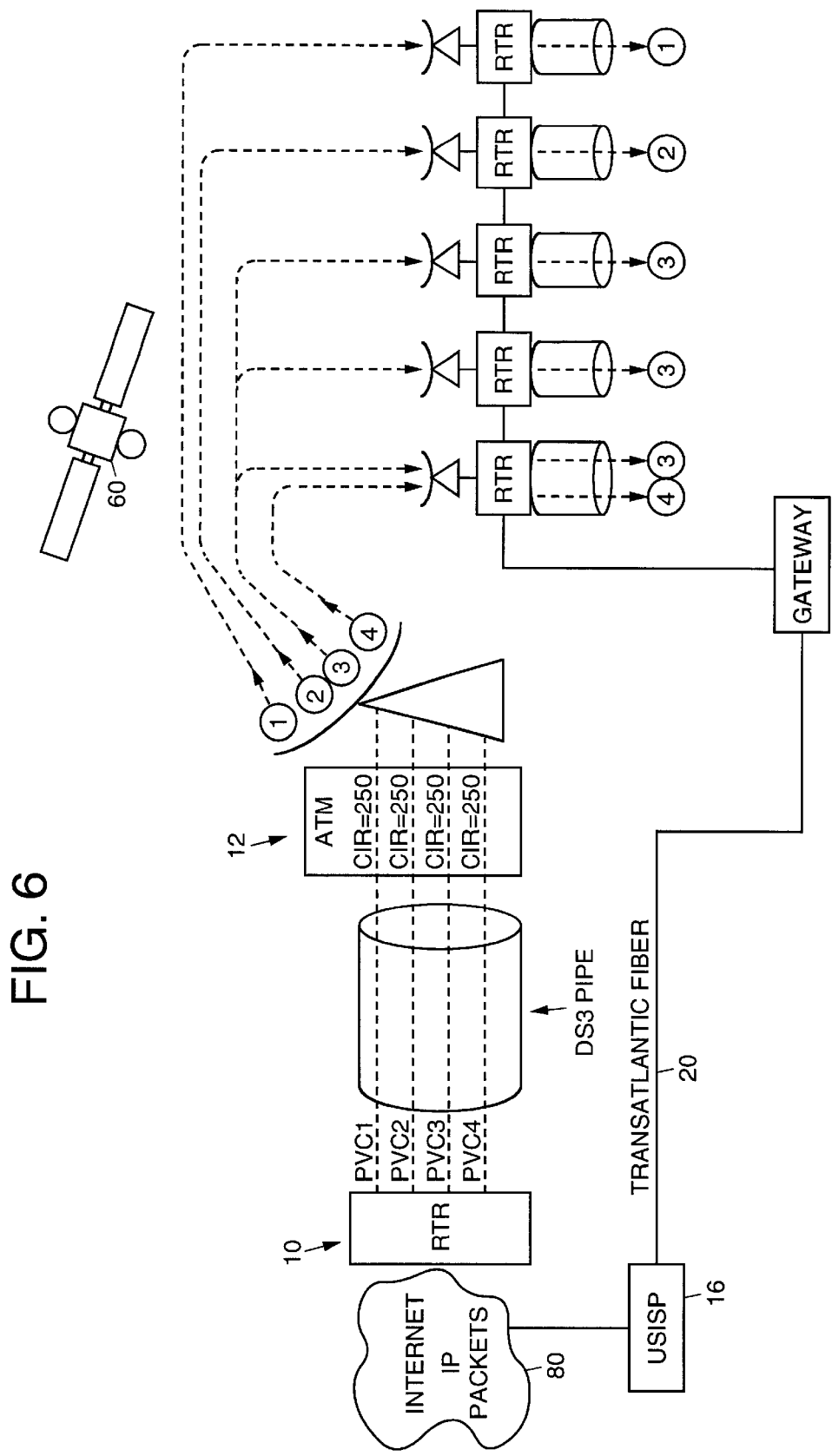
FIG. 6 is a block diagram illustrating the invention in greater detail and including components of each of the arrangements illustrated in FIGS. 1–5.

FIG. 5 illustrates an alternate embodiment of the present invention applicable to large private customers such as multinational corporations. The satellite access service provides a customer at a remote site 70 with access to a corporate host server 805 as well as to the Internet, as represented by server 801. The service routes REQs from remote client terminals C to destination servers 805 (such as would be located at corporate headquarters in the US), servers 801 located on the US Internet, and servers 901 located on the European Internet.

A REQ from a client C is routed over a channel or channels on satellite 60 with the use of proxy servers. A local proxy server 75 is provided at the remote site 70 and a central proxy server 53 is provided at the POP 50. The proxy servers ensure that information is correctly routed, and also provide protocol isolation and local caching. The proxy servers provide address spoofing to route packets over the satellite to the remote site 70, and also provide protocol spoofing to improve performance of large file transfers.

A remote site VSAT (Very Small Aperture Terminal) 72 processes the data stream of multiplexed packets generated at the POP 50, which contains multiple PVCs. The service supports proxied applications, which are directed to the local proxy server for routing to the appropriate real server (801, 805, or 901), and other applications routed by the customer's remote router 73. Data flows for this embodiment are similar to the flows for the embodiment of FIGS. 1 through 4, except instead of a terrestrial circuit, requesting paths are routed through the US and European Internets. This embodiment assumes that the customer already has connectivity with the European Internet.

FIG. 6 is a block diagrammatic representation showing the invention in greater detail and including components of each of the arrangements illustrated in FIGS. 1–5. The terrestrial link 11 comprises a DLCI 125, and a DS3 pipe 128. DLCIs 124-1, . . . , N convert IP packets to PVCs 130-1, . . . ,N respectively. PVCs are transmitted from the router 103 in the POP 10 to the switch means 12. The router function of the DLCIs may be distributed between the hybrid network service provider 10 and routers in high volume ISPs 16. Response packets from the high volume ISPs are advertised by the DLCIs 124 with high priority and preference toward the satellite uplink 14. In the distributed context or where the routers are included solely in the USISPs 16, routing tables for the routers are integrated into the hybrid network in accordance with instructions from the hybrid network service provider. It is contemplated that this function will at some future time be predominantly incorporated in to the hybrid network service provider POP 10.

The router function allows PVCs to be shared worldwide to maximize use of bandwidth to deliver data time zones in which maximum activity, normally daytime activity, is taking place. PVCs are distributed across multiple time zones in a condition responsive manner. A PVC with a particular bandwidth imposed thereon may be assigned to group ISPs in two different time zones whose peak utilization times are out of phase. Depending on the user's activities, phase differentials of ISP groups are selected to optimize bandwidth so that one users peak activities correspond with another user's inactivity.

The switch means 123 preferably comprises a frame relay switch, and may alternatively comprise an asynchronous transmission mode switch. The switch means 12 should be configurable in accordance with known protocols so that it may be used in accordance with the teachings of the present invention. The switch means is managed be selecting in advance through use of protocols the bandwidth it will impose on PVCs. One form of management is to configure to switch means 123 to assign for selected periods of time additional bandwidths to selected PVCs. Volume monitor means may be integral in the switch means 123 so that the switch means 123 can be configured to be condition responsive and to provide burst capability.

In the present exemplification, PVCs 130-1 through 4 are illustrated. Uplink facility 12 includes an FRS or ATM switch including preselected CIRs 136. Four CIRs are illustrated and labeled by their respective bandwidths, namely CIR 136-128, CIR 136-64, CIR 136-1024 and CIR 130-256. Router 103 seeks to maximize the number of IP sessions on the PVCs. The sessions are statistically multiplexed on the PVCs. Well-known multiplexing protocols are used. Additionally, the PVCs are statistically multiplexed in the uplink facility 12 into the CIRs by the router 103. The router 103 seeks to maximize usage. Packets that are not included in CIRs are discarded. By highly statistically multiplexing the PVCs, discarding traffic at peak periods is eliminated or substantially reduced. Scalability is provided through configuration of the switch means 123. Therefore the hybrid network can be expanded significantly with incremental capital expenditure.

At the remote POP 22, each router receives each PVC. Routers each filter the PVCs and allowing those PVCs to pass to the requesting user. Unicast, multicast or broadcast may be provided. A user in a group ISP may find it far more cost effective to purchase bandwidth in this hybrid network on an as needed basis the to pay for additional dedicated bandwidth on a terrestrial link. An exchange point as used herein is a network facility uses by ISPs to pass data between each others networks.

Figure 7:
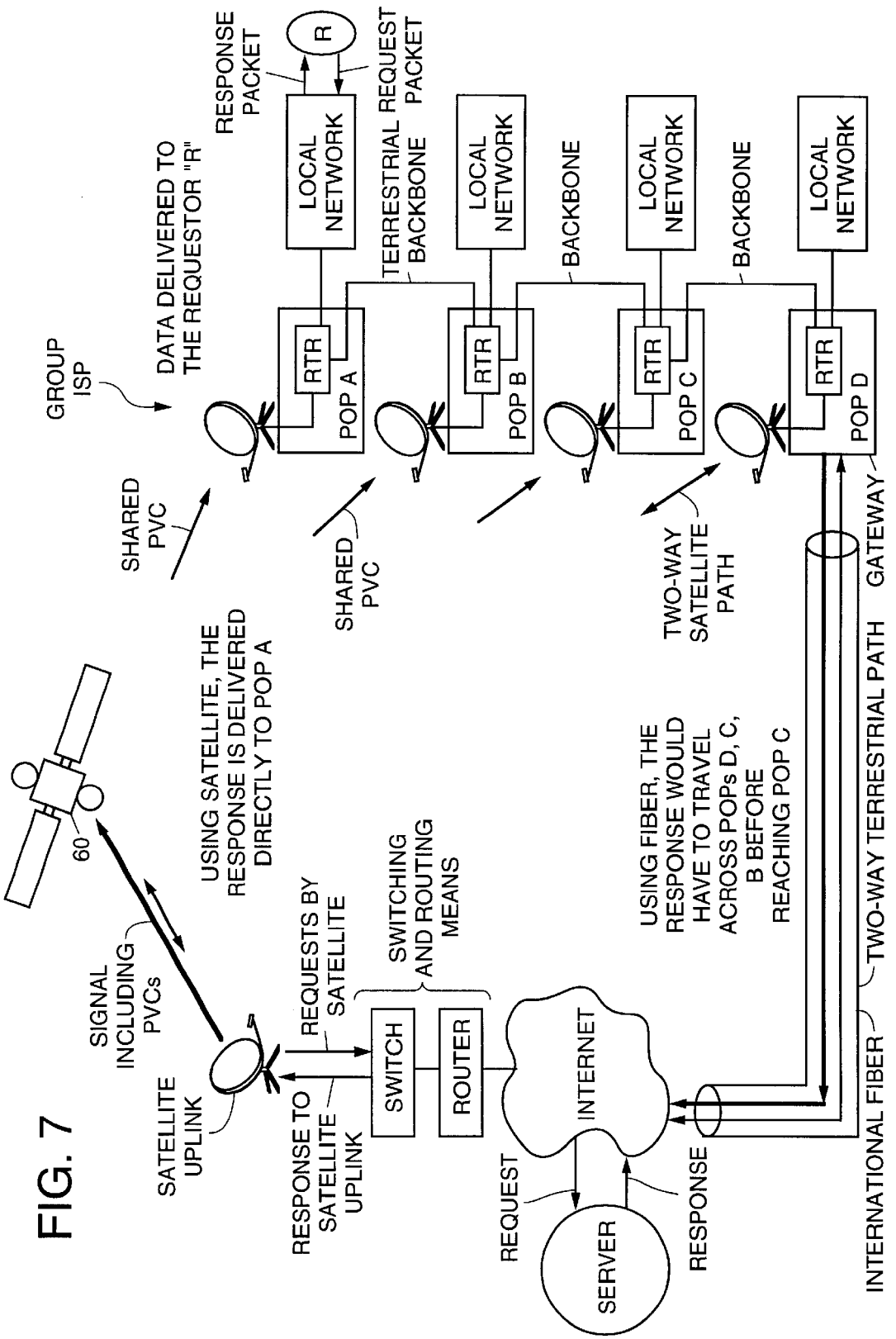
FIG. 7 is a block diagram illustrating the flow of request and response packets in the present invention as well as further details.

FIG. 7 is a block diagram illustrating the flow of request and response packets in the present invention as well as further details. As seen in FIG. 7, the hybrid network provider can send PVCS to each group ISP POP using either a one-way terrestrial, one-way satellite configuration or a two-way satellite configuration or a multiple satellite and terrestrial configuration. Because of this capability, redundant paths are provided. If either the satellite or terrestrial link is disabled, communication may be diverted to the other link. Switching is accomplished using router means. A router is contained for example within POP C. A very small aperture terminal (VSAT) is formed by an antenna, radio frequency transmitter and/or receiver, and a satellite modulator or demodulator. The VSAT is illustrated in FIG. 6 by the antenna dish symbol resting on a triangle.

In the embodiment of FIG. 7, the router means and switch means 123 are set in accordance with protocols to deliver multicast, unicast or broadcast transmissions from the hybrid network provider POP to each group ISP POP. In one preferred form of the invention, in accordance with instructions from the hybrid network provider for configuring routers, nondelay-sensitive information will be sent via terrestrial line to group ISPs; delay-sensitive data, large file transfers and multicast/unicast/broadcast traffic will be transmitted over the satellite link.

Figure 8:
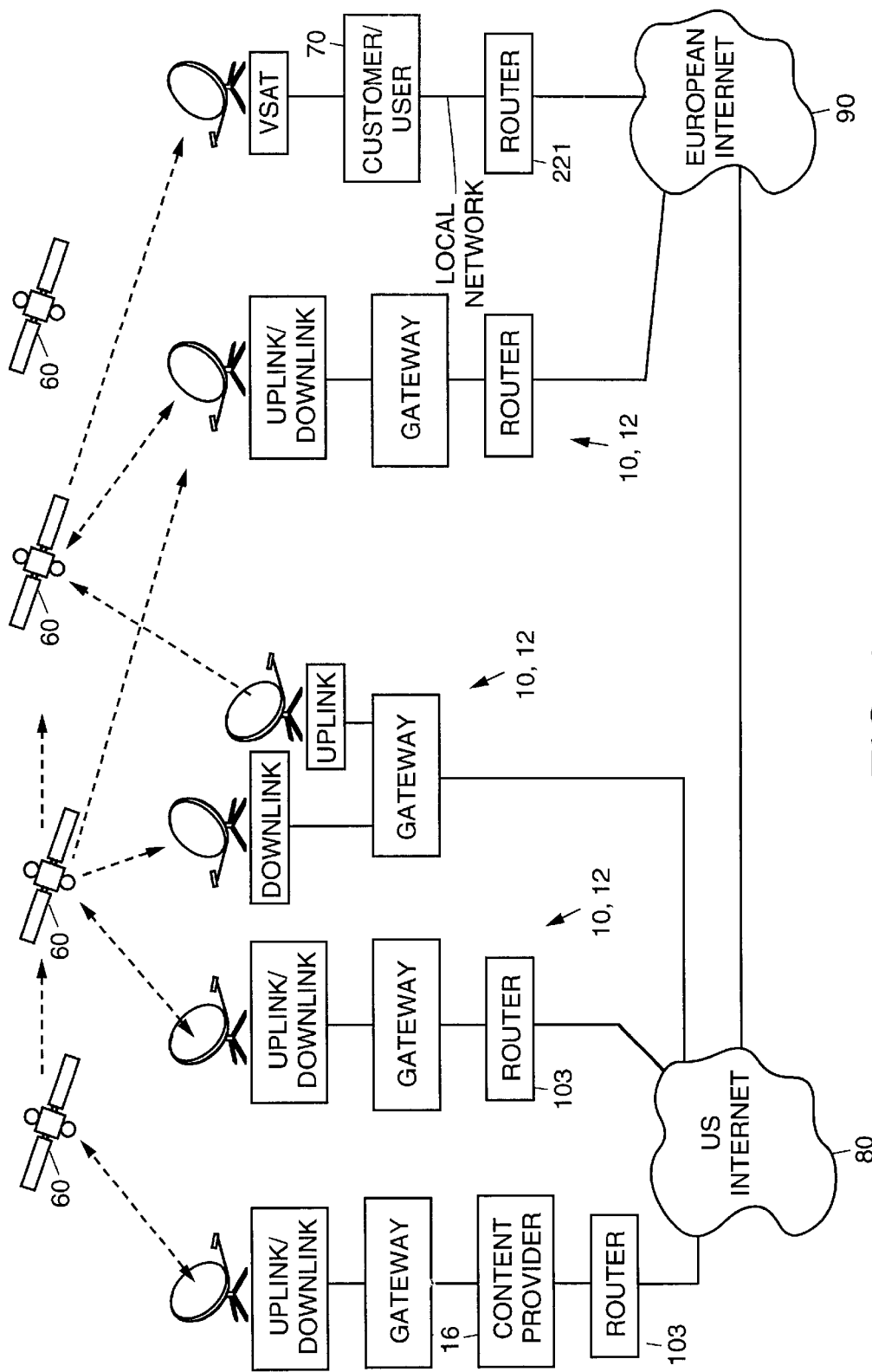
FIG. 8 illustrates a multi-satellite embodiment of a asymmetric, hybrid terrestrial-satellite Internet communications network in accordance with the principles of the present invention.

FIG. 8 illustrates a multi-satellite embodiment of a asymmetric, hybrid terrestrial-satellite Internet communications system or network in accordance with the principles of the present invention. FIG. 8 is intended to illustrate numerous configurations that may be implemented in accordance with the principles of the present invention. The basic components needed to implement the various embodiments of the present system or network will be described.

The system or network employs one or more satellites 60, and preferably a multiplicity or constellation of satellites 60. One or more gateways, such as the satellite uplink/downlink POP 12, or other communication entity, is provided that allows communication with the satellites 60. The one or more gateways, or satellite uplink/downlink POP 12, are connected to the Internet 80.

A content provider or Internet service provider (ISP) 16 is coupled to the Internet (illustrated as the US Internet) by means of a router 103. The content provider or Internet service provider (ISP) 16 may also have an uplink that allows direct uplinking of content to one or the satellites 60, although normally, uplinking of content is provided through the gateways, or satellite uplink/downlink POP 12.

A customer at a remote site 70 is coupled by way of a router 221 to the Internet (illustrated as the European Internet 90). This allows the customer to route requests for content to the content provider 16 by way of the Internet 80, 90. The customer has access to the local satellite uplink/downlink POP 12 which may be used to route content that is downloaded to the customer by way of one or more satellites 60 in the manner described with reference to FIGS. 5–7 for example. Alternatively the customer 70 may have a VSAT receiver that permits direct reception of content transmitted from the content provider 16 by way of the satellites 60.

As was mentioned previously, normally, requests for content are transmitted by way of the terrestrial link using the Internet 80, 90. Alternatively, the satellite link may be used to transmit requests for content to the content provider 16. Thus, the requests would be uplinked by way of the local gateway to the satellite 60 and would be routed through one or more satellites 60 to a gateway (the satellite uplink/downlink POP 12) local to the content provider 16, or directly to the content provider 16.

It is to be understood that requests for content and the requested content may be routed from the content provider 16 to the customer 70 using any combination of satellites 60 and gateways, such as is illustrated in FIG. 8. The requests and requested content may be uplinked to one satellite 60 and transmitted to one or more additional satellites 60 before it is downlinked to either the gateway local to the customer 70 or the customer 70. The requests and requested content may also be uplinked to one satellite 60 and then downlinked and uplinked to another satellite 60, and so on, until the requested content is downlinked to the gateway local to the customer 70 or the customer 70. These transmission scenarios also apply to transmission of the requests for content submitted by the customer 70. Furthermore, the use of permanent virtual circuits (PVCs) to enhance transmission of the requested content may be employed in the manner described.

The invention having been thus described, it will be apparent to those skilled in the art that the same may be varied in many ways without departing from the spirit and scope of the invention. Any and all such modifications are intended to be included in the scope of the following claims.

What is claimed is:

1. A hybrid satellite-terrestrial Internet communications system for providing high volume connectivity between an Internet service provider (ISP) and a remote customer site that generates a request for content to be supplied by the ISP, comprising:

a first gateway for processing a request for content generated at the remote customer site and for routing the request;

a second gateway for processing the request for content routed by the first gateway to route the request to the Internet service provider; and one or more satellites for transmitting requested content supplied by the Internet service provider to the remote customer site.

2. The system recited in claim 1 wherein the first and second gateways are interconnected by way of a terrestrial communications link.

3. The system recited in claim 2 wherein the terrestrial communications link comprises the Internet.

4. The system recited in claim 1 wherein the first and second gateways are interconnected by way of the one or more satellites.

5. The system recited in claim 1 wherein the second gateway is located at the Internet service provider.

6. The system recited in claim 1 further comprising a receiver that permits direct reception of content transmitted from the Internet service provider by way of the one or more satellites.

7. The system recited in claim 1 wherein the second gateway further comprises means for statistically multiplexing information packets comprising the requested content into permanent virtual circuits (PVCs) to maximize bandwidth usage.

8. The system recited in claim 1 wherein the first gateway comprises a router for directing received content to the remote customer site.

9. A method of implementing a satellite-terrestrial Internet communications network comprising the steps of:

providing a central proxy server for receiving information requests and sending out information and data;

providing local proxy servers for Internet service providers and customer sites;

providing a satellite communication link between the central proxy server and the local proxy servers; and sending requests from the local proxy servers to the central proxy server via the satellite communication link and sending the information and data from the central proxy server to the local proxy servers via the satellite communication link to distribute data and information by way of the satellite communication link to the local proxy servers.

10. The method recited in claim 9 further comprising the step of selecting data for storage in the local proxy servers.

11. The method recited in claim 9 further comprising the step of setting the priority of the information and data to be transmitted by the satellite communications link.

12. The method recited in claim 9 wherein the step of providing local proxy servers further comprises the step of providing caching at the local proxy servers.

13. The method recited in claim 9 wherein the step of providing a central proxy server further comprises the step of providing caching at the central proxy server.

14. The method recited in claim 9 wherein the step of providing a central proxy server further comprises the step of providing caching at the central proxy server and the step of providing local proxy servers further comprises the step of providing caching at the local proxy servers.

15. A satellite-terrestrial Internet communications network comprising:

a central proxy server for receiving information requests and sending out information and data;

local proxy servers disposed at customer and Internet service provider sites for sending out information and data requests and receiving and storing requested information;

satellite connecting apparatus for connecting the central proxy server with the local proxy servers; and apparatus for sending requests from the local proxy servers to the central proxy server via the satellite connecting apparatus and for distributing data and information to the local proxy servers via the satellite connecting apparatus.

16. The communications network recited in claim 15 wherein the connecting apparatus comprises a satellite communication link for coupling the central proxy server to the local proxy servers.

17. The communications network recited in claim 16 wherein the local proxy servers send requests to the central proxy server via the satellite communication link and wherein the central proxy server sends the information and data to the local proxy servers via the satellite communication link.

18. The communications network recited in claim 15 wherein the central proxy server and the local proxy servers each comprise a cache.

19. A method of operating a satellite-terrestrial Internet communications network comprising the steps of:

receiving requests for information or data from one or more local proxy servers through a satellite communications link;

determining the location of the requested information or data;

retrieving the information or data; and sending the requested information or data through the satellite communications link to the one or more local proxy servers.

20. The method recited in claim 19 wherein the step of sending the requested information or data comprises sending the requested information or data from the central proxy server to all local proxy servers through the satellite communications link.

21. The method recited in claim 19 wherein the step of receiving requests for information or data comprises the step of caching the requested information or data.

22. The method recited in claim 19 wherein the step of sending the requested information or data to the one or more local proxy server comprises caching the requested information or data at the one or more local proxy server.

23. The method recited in claim 19 wherein the step of receiving requests for information or data comprises the step of caching the requested information or data, and the step of sending the requested information or data to the one local proxy server comprises caching of the requested information or data at the local proxy server.

24. A method for providing high volume connectivity between an Internet service provider (ISP) and a remote customer site that generates a request for content to be supplied by the Internet service provider comprising the steps of:

generating a request for content at the remote customer site;

processing the request for content to route it to the Internet service provider by way of the one or more satellites; and transmitting requested content supplied by the Internet service provider by statistically multiplexing information packets comprising the requested information into permanent virtual circuits (PVCS) to maximize band usage to the remote customer site by way of one or more satellites.

25. The method as defined in claim 24 wherein the step of transmitting requested content further comprises routing the received content to the remote customer site.

* * * * *